Mar. 6, 1923.
O. R. WIKANDER
1,447,453
ROLLER BEARING
Filed Dec. 28, 1921
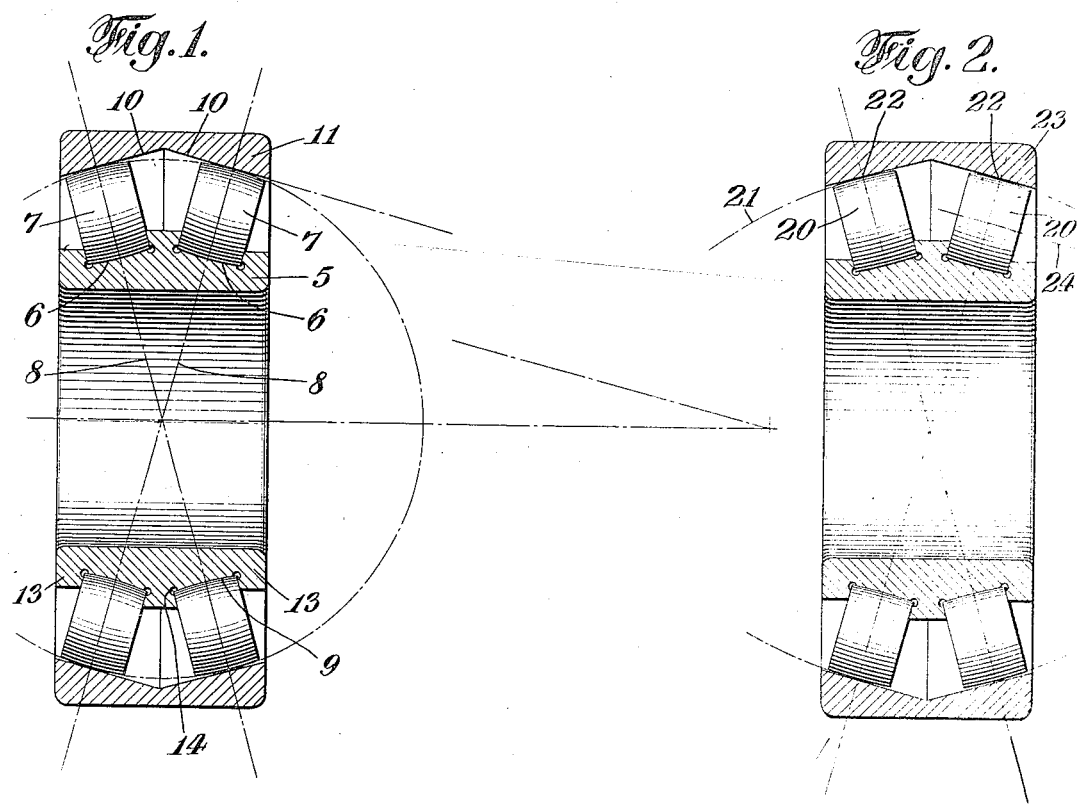
INVENTOR
O. R. Wikander.
BY Rogers, Kennedy Campbell
ATTORNEYS Patented Mar. 6, 1923.

1,447,453

UNITED STATES PATENT OFFICE.

OSCAR RAGNAR WIKANDER, OF GLEN RIDGE, NEW JERSEY, ASSIGNOR TO THE SKAYEF BALL BEARING COMPANY, OF HARTFORD, CONNECTICUT, A CORPORATION OF CONNECTICUT.

ROLLER BEARING.

Application filed December 28, 1921. Serial No. 525,330.

*To all whom it may concern:*

Be it known that I, OSCAR R. WIKANDER, a citizen of the United States, residing at Glen Ridge, in the county of Essex and State of New Jersey, have invented certain new and useful Improvements in Roller Bearings, of which the following is a specification, reference being had therein to the accompanying drawing.

This invention relates to anti-friction roller bearings, and has for an object to provide a double row roller bearing capable of carrying heavy radial loads and in addition thrust load in either direction and in which bearing there is permitted a certain amount of self-aligning movement or tilting of one part relatively to the other. This self-alignment varies in extent from a bearing in which the inner ring and the rollers carried thereby may be tilted so as to bring the rollers entirely outside the outer ring at opposite sides thereof, or one in which the tilting is very slight and practically negligible in a structure coming within the usual tolerances for annular bearings made up as self-contained handling units.

In the drawings accompanying this specification two illustrative embodiments of the invention are shown, in which drawings:

Figure 1 shows my invention applied to a self-aligning bearing, this being shown in axial section, and Fig. 2 is a similar view of a modification in which the amount of alignment or relative tilting of the two parts is restricted.

The bearings to which this invention relates are of the so-called barrel-shaped variety, that is, the rollers are generated by rotating a curved line of considerably greater radius than the radius of the roller about the axis of the roller. There have been many propositions advanced for making a bearing having two rows of such rollers self-aligning, and so far as I am aware in all of these the race track in the outer member has been formed as the segment of a hollow sphere over which the contacting point or surface of the roller moves from side to side of its normal path incident to the variation of the misalignment of the shaft upon which the inner ring is mounted. According to my invention, however, lateral movement of the rollers incident to the misalignment of the shaft shifts the point or area of contact laterally of the roller, but the point of contact or path of contact with the outer race remains substantially constant.

For the purpose of expediting the arrival at an understanding of the underlying principles of this invention, reference will first be made to the example shown in Figure 1 which illustrates a self-aligning bearing. In this figure there is an inner race ring, 5, adapted to be mounted upon a shaft, in some suitable manner, and provided on its exterior with two roller grooves or raceways, 6, in which there are respectively mounted rows of rollers, the members of which are indicated by the character 7. The axes of the rollers of each row are all located on a cone, the apex of which is situated on the axis of the bearing. The rollers are shown symmetrical around their transversal central planes and each such plane passes thru the center of the bearing. The position of this plane in relation to the axis of the bearing is illustrated by its line of intersection, 8, with the plane of this figure. The generatrix, 9, of the roller fits, with line contact, at the bottom of the grooves, 6. The longitudinal curvature of the rollers is in this instance formed on a radius equal to the radius of the path of contact of the rollers with the faces 10—10 on the outer race, 11. The proportions of the parts, as in the single row bearing particularly described in my co-pending application Serial No. 382,267, filed May 18th, 1920, for anti-friction bearings, are preferably such that the longitudinally curved outer surface of the rollers, that is, the surfaces farthest away from engagement with the surfaces of the races 6—6 of the inner ring, coincide with a sphere having its center located at the axis of rotation of the bearing represented by the line 12.

The lines 8—8 represent substantially the lines of force passing from the inner race thru the rollers to the outer race. The faces 10—10, are shown as cones having coincident axes which, at the points of contact with each of the several rollers, coincide with tangents to the rollers at such points. In the illustrated position in which the bearing may be assumed to be supporting pure radial load the point of contact of any roller with the outer raceway is substantially at the geometrical center of its outer surface. As the inner member tilts relatively to the outer member the line of contact moves from its center position upon the roller to a position toward the end, but by having such outer surfaces of all the rollers lying in a sphere there is a true rolling movement without any lost motion. The rollers, whether in their normal position or tilted to one side or the other, roll upon substantially the same path or track upon the faces 10—10.

On account of the symmetrical shape of the roller around its transversal central plane and due to the fact that the force of reaction from the outer race acts in radial direction along said plane it follows that the roller is not subject to any thrust pressure, as is the case in known designs of similar bearings, in which the rollers are conical in shape. There is, however, a certain tendency of skewing, which tendency, however, is counteracted by the fact that the rollers are guided by flanges 13—13 and 14.

While preferably there is a theoretical point contact between the roller and the outer raceway, the presence of a point contact or the extension of the area of contact longitudinally of the roller is dependent largely upon the equality of the radii of the roller curvature and the circular path upon which the rollers track upon the outer raceway and upon the amount of deformation of the contacting surfaces under load. In Figure 2, the rollers, 20, are generated by the rotation of a curve, 21, having a radius considerably greater than the radius of the race track, 22, on the outer ring, 23, preferably about four times as great, about the axis, 24, of the roller. In this form, as in the one described in connection with Fig. 1, the track faces, 22—22, are cones having their faces coinciding with the tangents of the faces of the rollers at the point of contact or at the point of application of the load. The load carrying capacity is increased by producing a close osculation between the roller and the outer race at the point of contact or area of contact. As the radius of curvature of the roller increases the freedom of relative tilting or self-alignment decreases.

The feature of providing a roller bearing, wherein the load carrying surface of each of the rollers is generated by rotating about the axis of the roller, a curved line of considerably greater radius of curvature than the radius of curvature of the circular conical surface comprising the roller paths on the outer race member, is claimed in my co-pending application, Serial No. 525,331 for roller bearings, filed contemporaneously herewith.

I claim as my invention:

1. In a roller bearing, the combination with an outer member having a raceway formed as two hollow cones set base to base, of a pair of rows of rollers running upon the said raceway and formed with longitudinally curved surfaces lying on a sphere having its center on the axis of the cones at the plane of the bases thereof, and an inner member provided with concave grooves forming races for said rollers.

2. In a roller bearing, the combination with an outer member having a raceway formed as two hollow cones set base to base, of a pair of rows of rollers running upon the said raceway and formed with longitudinally curved surfaces lying on a sphere having its center on the axis of the cones at the plane of the bases thereof, and an inner member provided with concave grooves forming races for said rollers the radius of the curvature of each groove corresponding substantially to the radius of the said groove.

3. In an anti-friction bearing, the combination with two rows of barrel-shaped rollers, of an inner member provided with a pair of concave grooves for said rollers, and an outer member having a pair of hollow conical roller engaging surfaces, the parts being so proportioned and located in such positions that the roller engaging face of the outer member lies in a line substantially tangential to each roller at the point of engagement between such roller and said face.

4. In an anti-friction bearing, the combination with two rows of barrel-shaped rollers, an inner member provided with a pair of concave grooves for said rollers and adapted to hold the same with their outer curved faces lying on a sphere and an outer member having a pair of hollow conical roller engaging surfaces, the parts being so proportioned and located in such positions that the roller engaging face of the outer member lies in a line substantially tangential to each roller at the point of engagement between such roller and said face.

5. In a roller bearing, the combination with an outer member having a hollow conical raceway, of an inner member provided with a concave groove, and a row of rollers mounted in said groove, said rollers being longitudinally curved, the generatrix whereof is a curve of substantially the same radius as that of the path traversed by the rollers upon the said conical surface.

6. In a roller bearing, the combination with an outer member having a pair of hollow conical raceways, of an inner member provided with a pair of concave grooves, a row of rollers mounted in each said groove, said rollers being longitudinally curved, the generatrix whereof is a curve of substantially the same radius as that of the path traversed by the rollers upon the said conical surfaces.

In testimony whereof, I have affixed my signature hereto.

OSCAR RAGNAR WIKANDER.